(12) United States Patent
Pekarsky et al.

(10) Patent No.: US 7,010,844 B2
(45) Date of Patent: Mar. 14, 2006

(54) METHOD FOR ASSEMBLING COMPONENTS USING SPLIT SEAL

(75) Inventors: Lev Pekarsky, W. Bloomfield, MI (US); Yee Chow, Canton, MI (US); Gregory Gardner, Livonia, MI (US); Eric Nary, Macedon, NY (US); Gary Hafemeister, Plymouth, MI (US); Charles Schwab, Fort Mill, SC (US); Allan Hall, Victor, NY (US)

(73) Assignee: Ford Global Technologies, LLC, Dearborn, MI (US)

( * ) Notice: Subject to any disclaimer, the term of this patent is extended or adjusted under 35 U.S.C. 154(b) by 231 days.

(21) Appl. No.: 10/662,103

(22) Filed: Sep. 12, 2003

(65) Prior Publication Data

US 2005/0055818 A1    Mar. 17, 2005

(51) Int. Cl.
  *B23P 11/02*    (2006.01)
  *B21D 53/84*    (2006.01)
(52) U.S. Cl. .................................. 29/451; 29/888.3
(58) Field of Classification Search ................ 29/451, 29/450, 446, 428, 888.3; 277/311, 584; 137/614.03
  See application file for complete search history.

(56) References Cited

U.S. PATENT DOCUMENTS 4,840,379 A * 6/1989 Thoman, Jr. ................ 277/584
5,779,244 A * 7/1998 Moriarty et al. ............ 277/311

* cited by examiner

*Primary Examiner*—John C. Hong
(74) *Attorney, Agent, or Firm*—David B. Kelley; MacMillan, Solanski & Todd

(57) ABSTRACT

A method for assembling components that are sealed hydraulically or pneumatically includes forming an outer component having an inner surface, a groove for holding a seal, the groove having an opening at the inner surface. A seal is fabricated in the form of a substantially circular ring having a scarf cut extending through the width and the thickness of the seal, and a second inner surface having an inside diameter. The seal is then placing over a mandrel having a diameter that is larger than the inside diameter of the second inner surface so that the seal is expanded by plastic deformation such that a gap is formed at the scarf cut. Then the seal is inserted in the groove while the seal is expanded.

8 Claims, 4 Drawing Sheets

METHOD FOR ASSEMBLING COMPONENTS USING SPLIT SEAL

BACKGROUND OF THE INVENTION

The invention relates to the field of hydraulic and pneumatic seals; more particularly it pertains to a dynamic seal for an assembly having a rotating component.

A type of a split rotating seal, widely known as a scarf-cut plastic seal, is used in many industries and is manufactured by a large number of companies worldwide. This type of seal is used in most modern automatic transmissions to seal shafts and clutch components against the passage of hydraulic fluid, usually transmission fluid.

In many cases, a scarf-cut plastic seal is made from PTFE compound, short slender fibers of glass, graphite or Kevlar, and a number of additives, the amalgam being a homogeneous mixture of PTFE compound, the fibers and additives. A purpose of the fibers is to reinforce the PTFE compound in order to improve its structural properties or to produce a seal whose functional characteristics are particularly suited to an application of the seal or to the environment in which the seal is intended to function. The additives have a similar purpose.

This type of seal typically has a rectangular cross section and a beveled split or scarf cut having an angle in the range of 7–20 degrees when projected on the longitudinal axis of the seal. This type of seal can be installed in an outer groove formed in the outer surface or journal of a rotating or stationary shaft. Alternatively, the seal can be installed in an internal groove formed in a bore of a rotating or stationary housing.

Installation of the seal in an internal groove is often preferable for packaging considerations. Also its installation in an internal groove is preferable for structural considerations because a groove formed in a shaft reduces the strength and stiffness of the shaft, and is an important factor when the shaft carries a structural load, especially a cyclic load. When the seal is installed in an internal groove and is pressurized by hydraulic fluid, the radial inner surface of the seal is expected to have a tight sealing surface contact with the outer surface of the shaft. When the seal is installed in an internal groove, a lateral face of the seal is expected to have tight seal surface contact with the adjacent lateral face of the groove. Also, clearance must be provided between the outer surface of the seal and the outer surface of the groove.

Internal groove, scarf cut, plastic seal installation is not commonly used in high volume applications due to the potential for damage to the seal during installation of a shaft. Scarf cut seals tend to loose their cylindrical form due to radial compression, which results in plastic deformation. They become dislocated in the retaining groove due to clearance between the surfaces of the seal and the groove, and they are susceptible to deformation. These factors cause unintended interference between the installed seal and shaft as the shaft is inserted within a bore. The seal is often cut by the shaft during shaft installation, commonly referred to as a "cut seal" condition. Or the seal is unintentionally forced from its groove by the shaft as the shaft slides in the bore past the installed seal. FIG. 2 shows an example of a conventional scarf cut seal from the prior art installed in an internal groove and contacted by a shaft while the shaft is moved during installation within a bore.

Avoiding the propensity for scarf cut seals, installed in a groove of an assembly, to sustain damage and to dislocate during installation of other components of the assembly is a long felt need. It is desired to overcome the difficulties of assembly so that scarf cut seals can be used reliably in high volume production and assembly.

SUMMARY OF THE INVENTION

An advantage of this invention is the avoidance of damage to, and dislocation of scarf cut seals that frequently occurs during installation of assembly components after the seal is installed. Another advantage is the ability to apply to mechanized assembly in high volume production the reliable, effective sealing capacity of scarf cut seals used in hydraulic or pneumatic applications.

More specifically a seal according to this invention can be installed in internal grooves of a stationary housing without risk that seal damage and deformation of the seal will occur during assembly. The seal can be used in high volume production and assembly at low cost, without loss of assembly time or adding undue complexity to assembly and installation procedures.

A seal manufactured and assembled by the method of this invention forms a clearance-free seal and housing arrangement that facilitates assembly of a shaft and allows for effective, reliable sealing after fluid pressure is applied to the seal. The seal is applicable to hydraulic and pneumatic sealing.

A method for assembling components that are sealed hydraulically or pneumatically in accordance with this invention includes forming an outer component having an inner surface, a groove for holding a seal, the groove having an opening at the inner surface. A seal is fabricated in the form of a substantially circular ring having a width, a thickness, a scarf cut extending through the width and the thickness, and a second inner surface having an inside diameter. The seal is then placed over a mandrel having a diameter that is larger than the inside diameter of the second inner surface so that the seal is expanded by plastic deformation such that a gap is formed at the scarf cut. Then the seal is inserted in the groove while the seal is expanded. The assembly of components is completed and fluid pressure is applied to the assembly.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
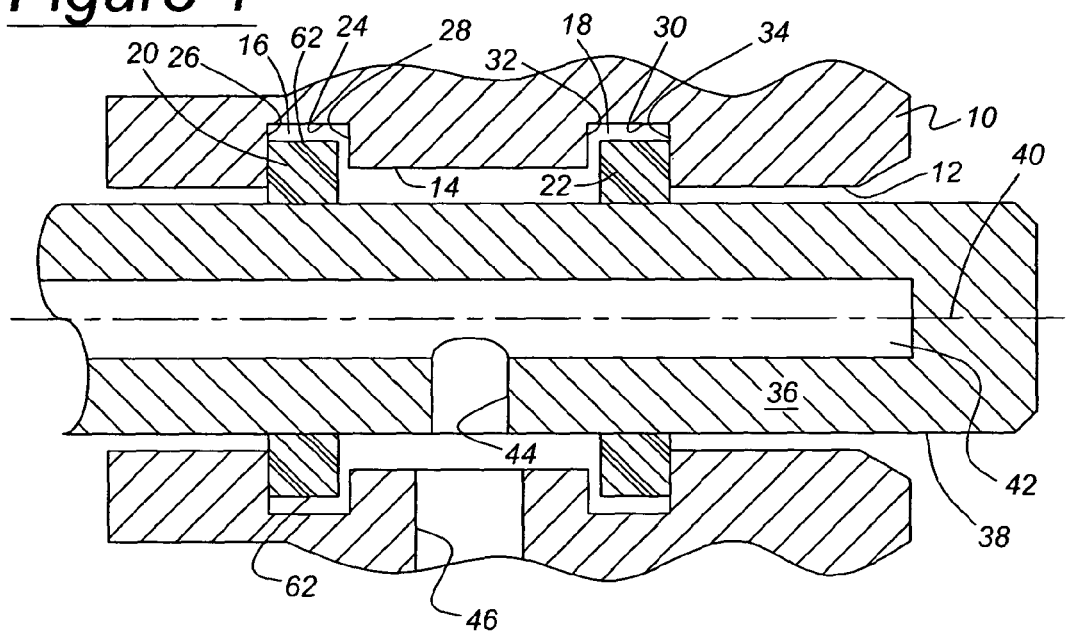
FIG. 1 is cross sectional side view showing an assembly in which a scarf cut seal according to this invention is installed.

Referring first to FIG. 1, an assembly to which the present invention may be applied includes a housing 10 having an axially directed bore 12 formed with a large diameter section 14. The inner surface of the housing is formed with axially spaced grooves 16, 18. Each groove contains a scarf cut seal 20, 22 according to the present invention. Groove 16 is formed with a radially outer surface 24 and lateral faces 26, 28. Similarly, groove 18 is formed with an outer surface 30 and lateral faces 32, 34. The assembly includes a shaft 36 having a right circular cylindrical outer surface 38 coaxial with a central longitudinal axis 40 of the housing 10 and shaft 36. A centrally located hydraulic passage 42 is formed in the shaft and extends along the axis. A radially directed passage 44 extends from the outer surface of shaft 36 to the central passage 42.

The housing 10 is formed also with a radially directed passage 46, aligned axially with radial passage 44. When the passages are exposed to a source of fluid pressure, preferably hydraulic pressure, the hydraulic passages are filled with fluid. Fluid pressure forces seal 20 leftward into contact with lateral surface 26, and fluid pressure forces seal 22 rightward into contact with lateral face 34. The fluid pressure also forces seal 20 radially inward into contact with the outer surface 38 of shaft 36. Similarly, seal 22 is forced by hydraulic pressure radially inward into contact with shaft 36.

Figure 2:
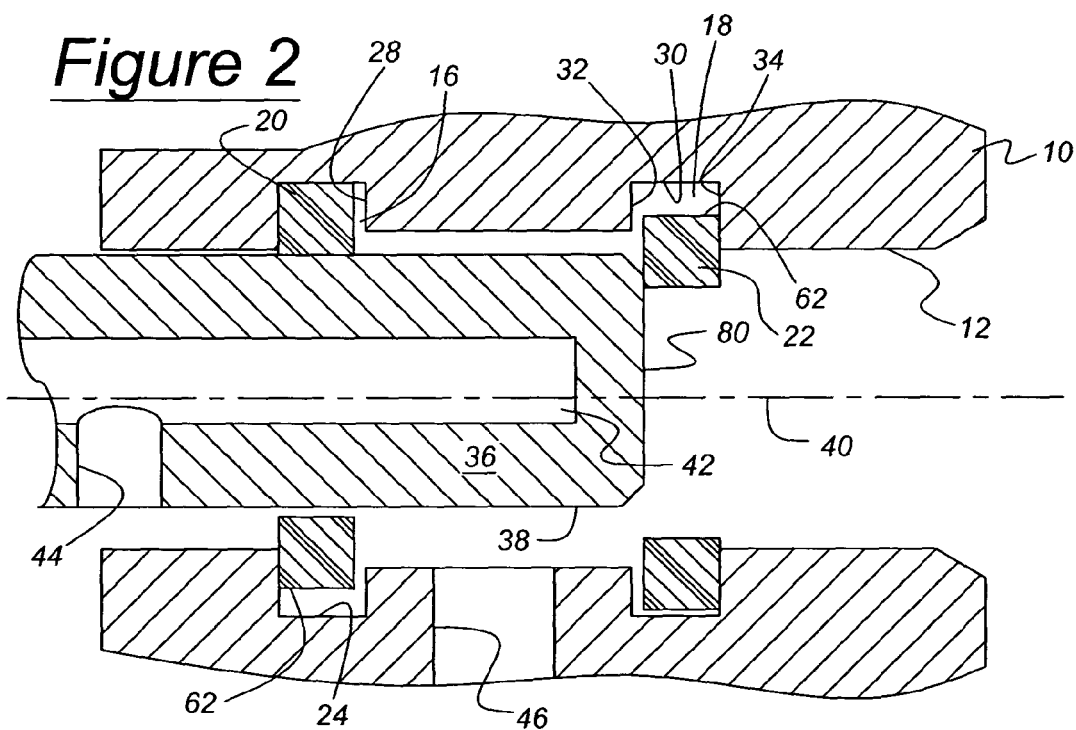
FIG. 2 is cross sectional side view showing a prior art, scarf cut seal installed in an internal groove and contacted by a shaft during installation of the shaft within a bore of an assembly.

Referring now to FIG. 2, an assembly similar to that of FIG. 1 contains scarf cut seals assembled by the procedure of the prior art. In this case, the seal 20 is located within its groove 16, and the shaft 36 is partially inserted through the bore of housing 10. However, seal 22 has moved radially away from the outer surface 30 of groove 18 at one diametric extremity of the groove and close to the outer surface of the groove at the opposite diametric extremity. In this position of the seal, the end 80 of shaft 36 contacts the lateral face of seal 22 while shaft 36 is moved rightward along the axis of housing 10. In the example illustrated in FIG. 2, the shaft 36 is not centered on the axis of housing 10; instead, it is located close to the surface 12 of the bore. The location of the shaft with respect to axis 40 and the incorrect location of the seal causes the contact between the shaft and the seal that typically occurs during the assembly process of prior art seals. Thus, as the shaft moves further rightward during its installation, it can shear through the width of seal 22, otherwise damage the seal, or dislocate the seal entirely from the groove in which it should be located.

Figure 3:
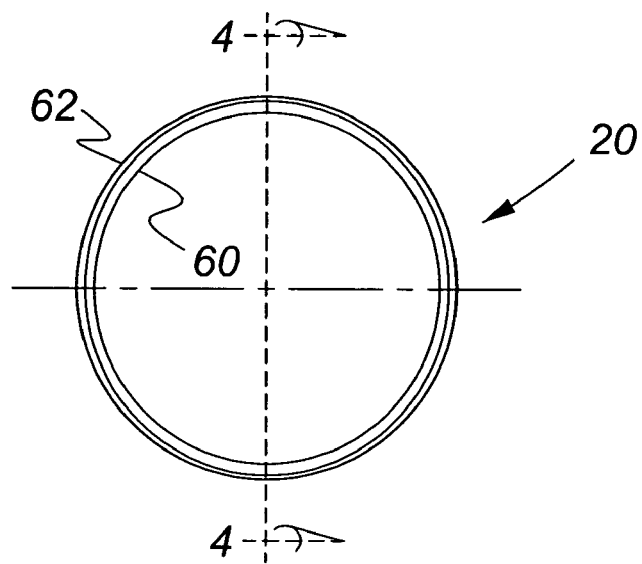
FIG. 3 is a side view of a split seal.
Figure 4:
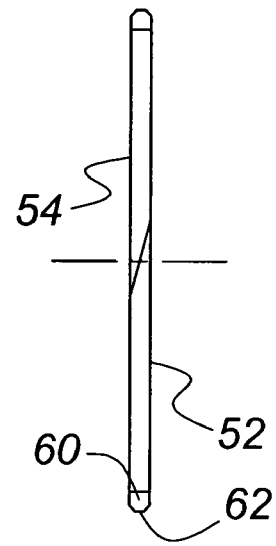
FIG. 4 is a cross section taken at plane 4—4 of FIG. 3.
Figure 5:
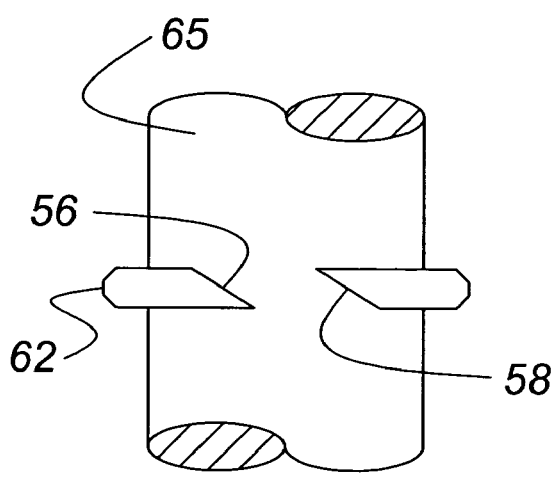
FIG. 5 is detail view at area 5 of the seal of FIG. 4.

The split or scarf cut seal shown in FIGS. 3–5 is fabricated from a PTFE compound reinforced with glass fiber, whose weight is in the range of 15–30 percent of the weight of the PTFE compound. The angle between the plane of the bevel cut or scarf slit relative to the plane of the lateral face of the seal is preferably in the range 13–17 degrees. The inside diameter of the seal is in the range 43.76–43.55 mm.; its radial thickness is in the range of 1.83–1.77 mm.; and the reference outside diameter of the seal is 47.26 mm. The nominal inside diameter of the seal is 1.789 inches, and its nominal radial thickness is 0.0728 inches.

Figure 6:
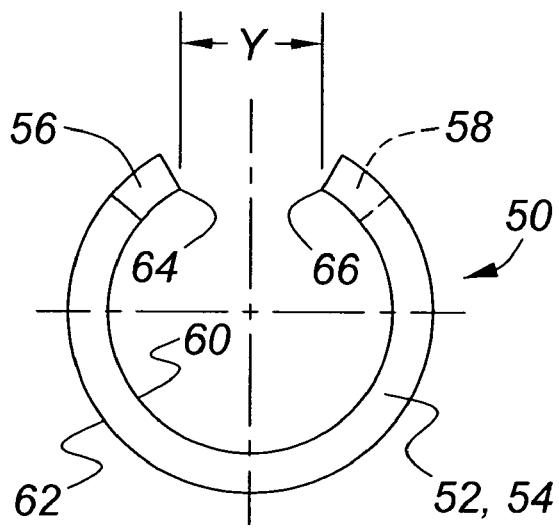
FIG. 6 is a side view of a seal in the free state showing a gap produced by plastic deformation.

After a seal is formed as shown in FIG. 3–5 to the dimensions mentioned above, the seal is plastically deformed by inserting a mandrel 65 through the inside surface of the seal. The mandrel 65 has an outer surface in the form of a right circular cylinder, whose diameter exceeds the diameter of the seal as the seal is originally formed, as shown in FIGS. 3–5. A purpose of the plastic deformation of the seal is to form a gap Y between the ends of the seal when the seal is in a free condition, as shown in FIG. 6. The mandrel 65 remains inserted in the seal for a period of at least 30 minutes or more. The gap Y formed by this method preferably should not exceed 0.80 inch. This action plastically deforms the seal particularly in the area 64 located about 180 degrees from the split and extending ten degrees in both angular directions from that location.

The size of the gap Y produced by plastic deformation of the seal by the mandrel 65, when that gap is measured after the seal is removed from the mandrel and the seal remains in a free state for at least one hour, can be determined by the following empirical regression equation $Y = -0.4625X^2 + 2.047X - 2.21$, wherein Y is the dimension of the final gap between seal ends in the free condition, X is the diameter of the mandrel 65, and all dimensions are in inches.

FIG. 6 is a side view of a seal after having been plastically deformed by inserting the mandrel 65 into the central opening of the seal. The seal 50 has a substantially rectangular cross-section having lateral faces 52, 54 at each axial side of the seal, a beveled surface 56, and a complementary beveled surface on the underside of the seal 58. The seal has an inner surface 60 and a radially outer surface 62. After having been deformed by the mandrel 65, the gap Y between the edges of the inner surface 64, 66 is produced.

A typical seal to be installed in an assembly having a shaft 36, whose outside diameter is in the range 1.5–2.5 inch should have a gap in the range 0.090–0.110 inch gap with the seal in the free condition prior to installation. The radial thickness of the seal should be selected so that a clearance between the outer surface 62 of the seal 20 and the outer surface 24 of the groove 16 does not exceed 0.040 inch when pressure is applied to the assembly.

The radial thickness of the seal should be minimized, preferably to less then 0.120 inch for a shaft having an outside diameter of 1.5–2.5 inch. in order to assure minimum radial resistance to deformation by hydraulic pressure. Alignment of parts and run-outs should be minimized to avoid creating any interference between the outer diameter of the seal and the inner diameter of the grooves. The inner free-state diameter of the seal should be made as close as possible to the outer diameter of the shaft at the maximum operating temperature in order to form a hydraulically tight line-to-line contact at the scarf cut position.

The seal is installed in the housing 10 by slightly coiling the seal 20 in the radial direction by an amount required to reduce it outer diameter to less than the inner diameter of the housing bore 12. This results in the end of seals overlapping in a helical manner. The seal is inserted into the bore 12 to the axial location of the groove 16 with the side of seal opposite the helical overlap leading the overlapped side. Then the seal is allowed to expand radially outward into the groove 16 elastically and by the application of light radial pressure tending to insert the seal in the groove. Preferably, installation of a seal is completed in about three seconds or less to ensure minimum plastic deformation. The installed seal should be energized by fluid pressure and subjected to a period of normal operation at an elevated temperature, up to about 200° F., in order to completely recover its initial free state condition.

Figure 7:
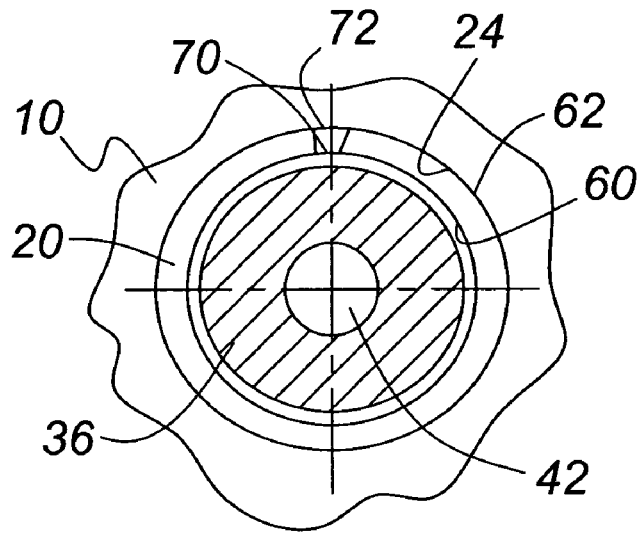
FIG. 7 is a partial cross section taken through a seal, shaft, and housing after assembly but before pressurizing.
Figure 8:
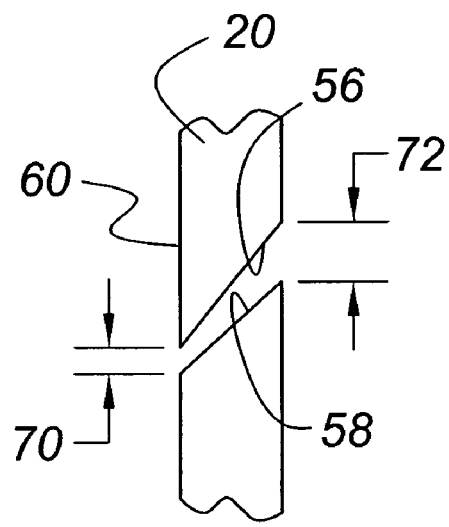
FIG. 8 is a partial side view of the seal after installation but before pressurizing the assembly.
Figure 9:
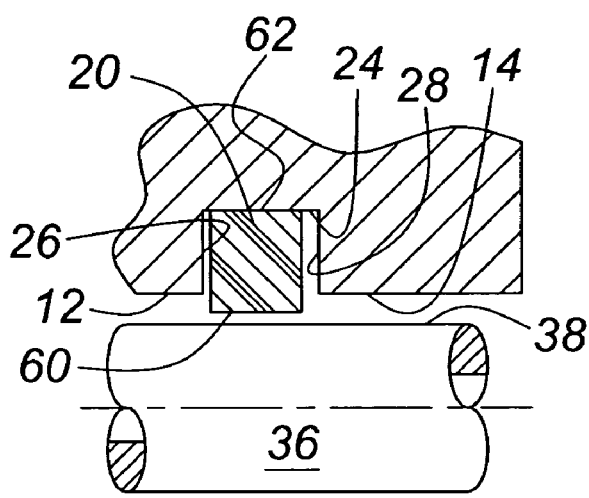
FIG. 9 is a partial side view of a seal, housing, and shaft after the seal is installed but before pressurizing the assembly.

FIGS. 7–9 show the position of a seal 20 installed in its groove 16 immediately after installation and before the assembly is pressurized. In this condition, seal 20 is expanded radially so that its outer surface 62 contacts the radially outer surface 24 of the groove. FIG. 8 shows the inclined surface 56 and the inclined surface 58, which together form the scarf joint. The radially inner surfaces of the seal at the scarf are spaced mutually circumferentially at 70, and the radially outer edges of the seal at the scarf surfaces are spaced mutually circumferentially at 72.

Figure 10:
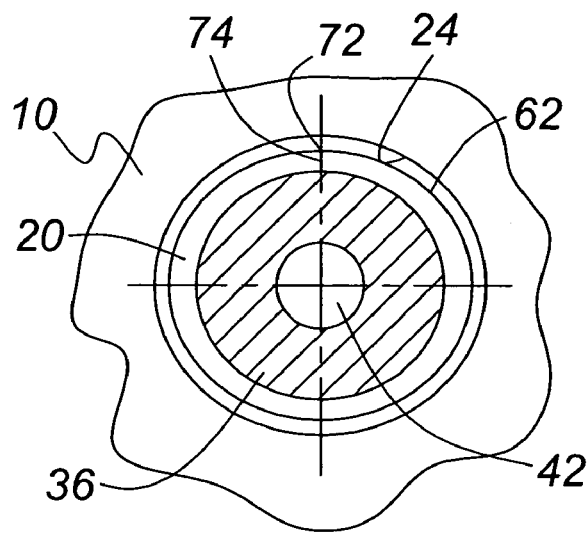
FIG. 10 is a partial cross section taken through a seal, shaft, and housing after pressurizing the assembly.
Figure 11:
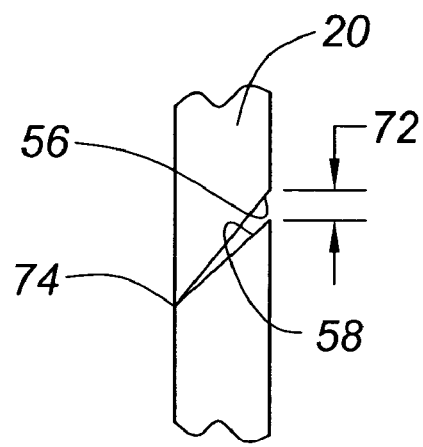
FIG. 11 is a partial side view of the seal after pressurizing the assembly, the arcuate shape being shown straightened.
Figure 12:
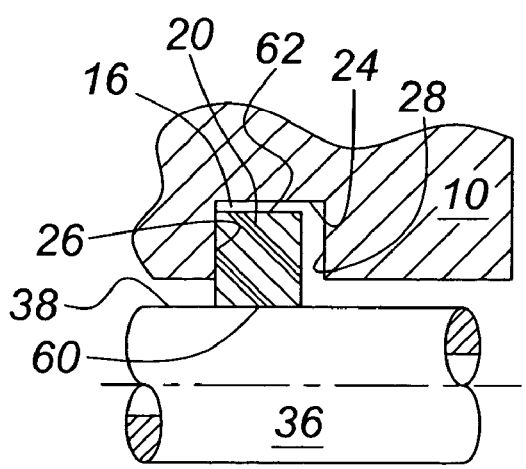
FIG. 12 is a partial side view of a seal, housing, and shaft after the seal is installed and the assembly is pressurized.

Turning now to FIGS. 10–12, FIG. 10 is a cross-section similar to the cross-section of FIG. 7 except that it shows the position of the seal in the groove 16 after pressure has been applied to the assembly. After the assembly is pressurized, the seal 20 moves to the left-hand side of groove 16 into sealing contact with the lateral face 26 of the groove 16. The pressure also forces seal 20 radially inward so that its radial inner surface 60 is in sealing contact with the outer surface 38 of shaft 36. FIG. 11 shows that the application of pressure after the seal is installed in its groove causes the surfaces 56, 58 of the scarf to move closer together such that they are in contact along line 74 and only slightly separated at 72.

Assembly conditions are improved by inserting a split seal in a housing without clearance by plastically deforming the seal before its installation. The degree of plastic deformation is selected in a manner to assure that the seal retains its sealing capacity when energized by the pressure of hydraulic fluid applied to the assembly after the seal is installed. The method creates neither non-circular areas on the seal nor lobes of a size sufficient to adversely effect shaft installation.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for assembling components, the method comprising the steps of:
   forming an outer component having an inner surface, the component formed with a groove for holding a seal, the groove having an opening at the inner surface;
   fabricating a fluid seal in the form of a substantially circular ring having a width, a thickness, a scarf cut extending through the width and the thickness, and a second inner surface having an inside diameter;
   placing the second inner surface over the outer surface of a cylindrical mandrel having a diameter that is larger than the inside diameter;
   expanding the seal on the mandrel such that the seal is plastically deformed and a gap is formed at the scarf cut; and
   inserting the seal in the groove after the seal is expanded.

2. The method of claim 1, wherein the step of expanding the seal further comprises the step of:
   circumferentially expanding the seal over the mandrel such that the seal is plastically deformed in a region of the seal diametrically opposite the location of the scarf cut.

3. The method of claim 1, wherein the step of expanding the seal on the mandrel further comprises the step of:
   forming a gap at the scarf cut, the gap having a length in a free condition that is equal to or greater than the length determined from the equation $Y=-0.4625X^2+2.047X-2.21$, where Y is the length of the gap, X is the diameter of the mandrel, and all dimensions are in inches.

4. The method of claim 1, further comprising the steps of:
   inserting a shaft having an outer surface into the outer component adjacent the inner surface; and
   pressurizing the groove to force the seal radially toward the shaft such that the second inner surface contacts the outer surface of the shaft.

5. The method of claim 1, further comprising the steps of:
   inserting a shaft having an outer surface into the outer component adjacent the inner surface; and
   pressurizing the groove to force the seal axially toward a lateral surface of the groove such that a lateral face of the seal contacts the lateral surface of the groove.

6. The method of claim 1, further comprising the steps of:
   inserting a shaft having an outer surface into the outer component adjacent the inner surface; and
   pressurizing the groove to force the seal radially toward the shaft such that the second inner surface contacts the outer surface of the shaft; and
   pressurizing the groove to force the seal axially toward a lateral surface of the groove such that a lateral face of the seal contacts the lateral surface of the groove.

7. The method of claim 1, wherein the step of fabricating a seal in the form of a substantially circular ring further includes the step of molding the seal of PTFE compound reinforced with glass fiber, whose weight is in the range of 15–30 percent of the weight of the PTFE compound.

8. The method of claim 1, further comprising the step of:
   recovering the free state condition of the seal by operating the seal under pressure at an elevated temperature of about 300° F.

* * * * *